United States Patent [19]
Vild et al.

[11] Patent Number: 5,411,128
[45] Date of Patent: May 2, 1995

[54] HEATED GLASS SHEET POSITIONING ON ROLL CONVEYOR

[76] Inventors: Michael J. Vild, 2526 Meadowwood St., Toledo, Ohio 43606; Daniel G. Common, 926 Mambino, Oregon, Ohio 43616

[21] Appl. No.: 177,360

[22] Filed: Jan. 3, 1994

[51] Int. Cl.6 ............................................. B65G 47/00
[52] U.S. Cl. ............................... 198/345.1; 198/411; 198/434; 198/782; 271/236; 65/182.2; 65/253
[58] Field of Search .............. 198/411, 434, 456, 721, 198/782, 345.1, 346.2; 271/234, 236, 238; 65/158, 182.2, 253, 273, 323; 414/676

[56] References Cited
U.S. PATENT DOCUMENTS

| | | | |
|---|---|---|---|
| 3,469,887 | 9/1969 | Nakahara et al. | 65/182.2 |
| 3,638,564 | 2/1972 | Prange et al. | 198/434 |
| 3,838,803 | 10/1974 | Berry | 414/676 |
| 3,990,570 | 11/1976 | Mercier et al. | 198/782 |
| 4,282,026 | 8/1981 | McMaster et al. | |
| 4,354,796 | 10/1982 | Bergman | 198/721 |
| 4,364,766 | 12/1982 | Nitschke | |
| 4,420,361 | 12/1983 | Valimont et al. | 198/345.1 |
| 4,437,872 | 3/1984 | McMaster et al. | |
| 4,475,937 | 10/1984 | Nitschke | |
| 4,493,412 | 1/1985 | Krehnovi | 271/236 |
| 4,895,244 | 1/1990 | Flaugher | 198/456 |

*Primary Examiner*—Joseph E. Valenza

[57] ABSTRACT

Apparatus (22) and a method for positioning a heated glass sheet on rolls (26) on a conveyor (24) utilizes an air hearth (28) for supplying upwardly directed pressurized air and an elevator (32) for providing relative movement between the rolls and the air hearth for either the conveyance or floating of the glass sheet over the rolls to allow a positioner (36) to position the heated glass sheet while out of engagement with the rolls. The air hearth (28) has stationary supports (38) and the elevator (32) has cam actuators (42) that move the rolls (26) of the roll conveyor (24) vertically with respect to the stationary air hearth between raised and lowered positions to provide either the roll conveyance or floated glass sheet positioning.

22 Claims, 9 Drawing Sheets

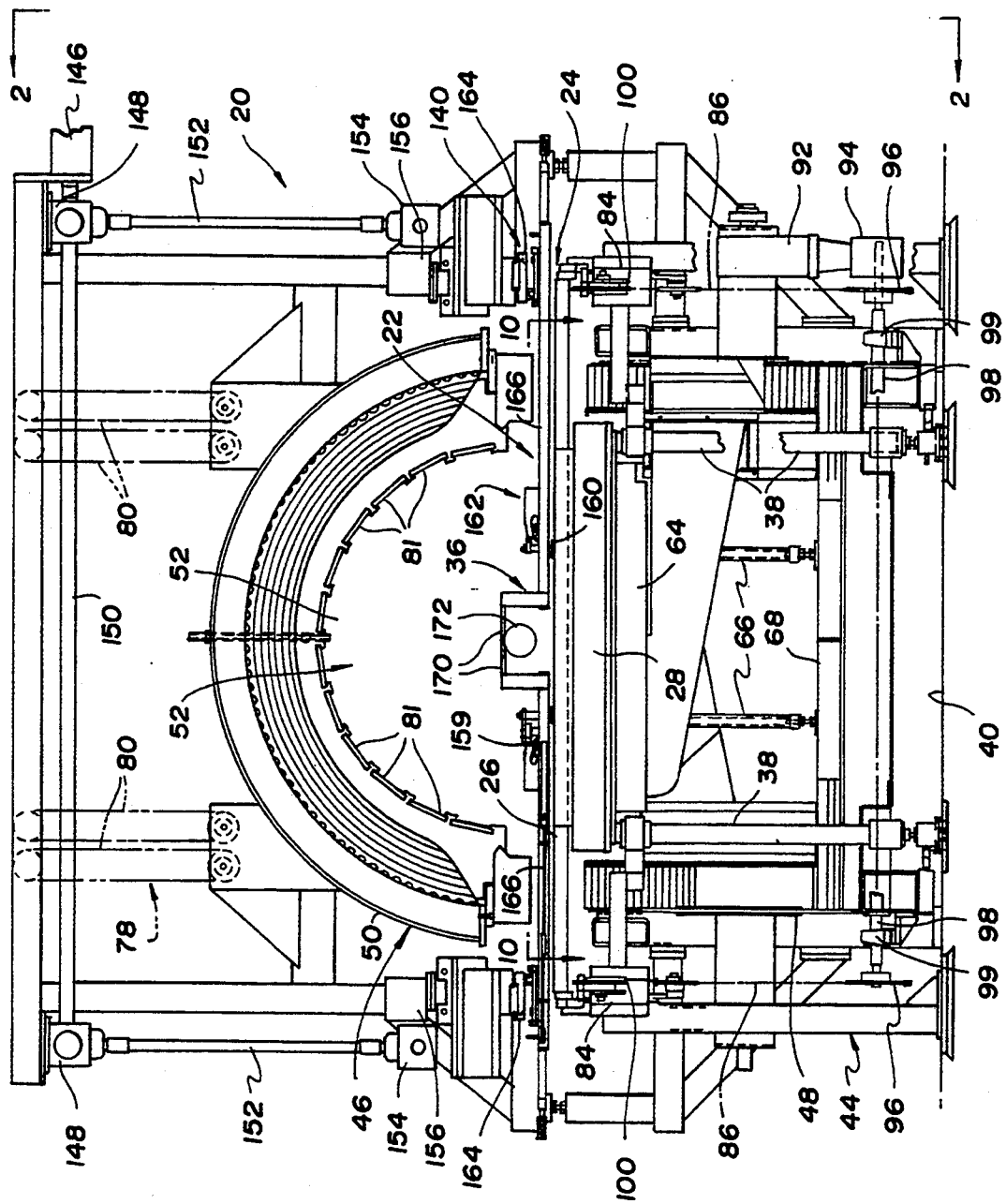

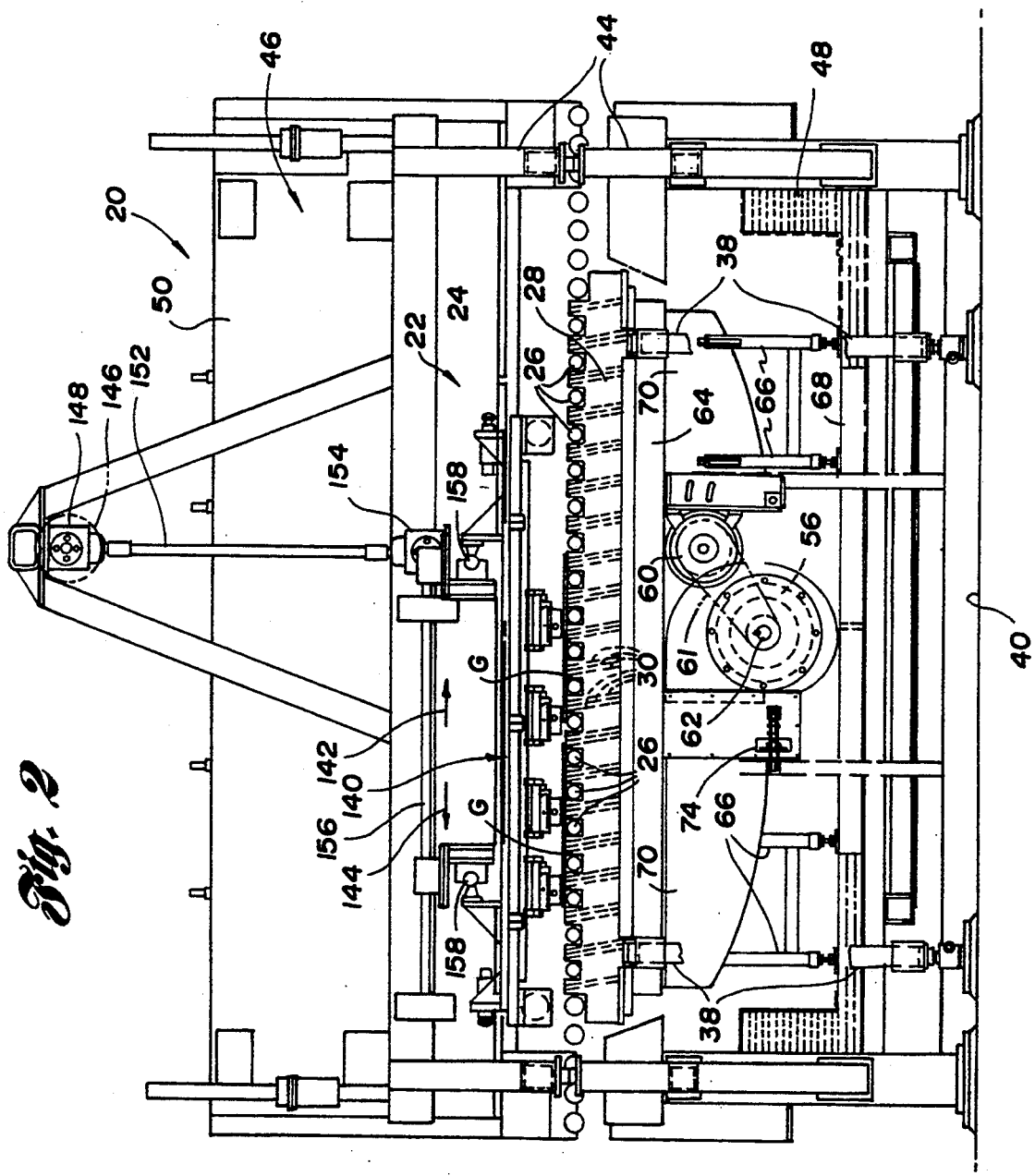

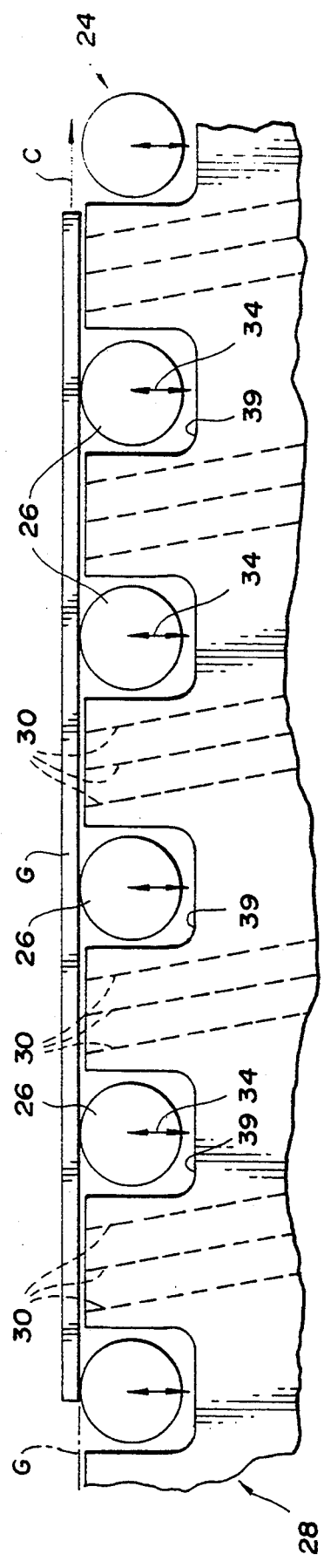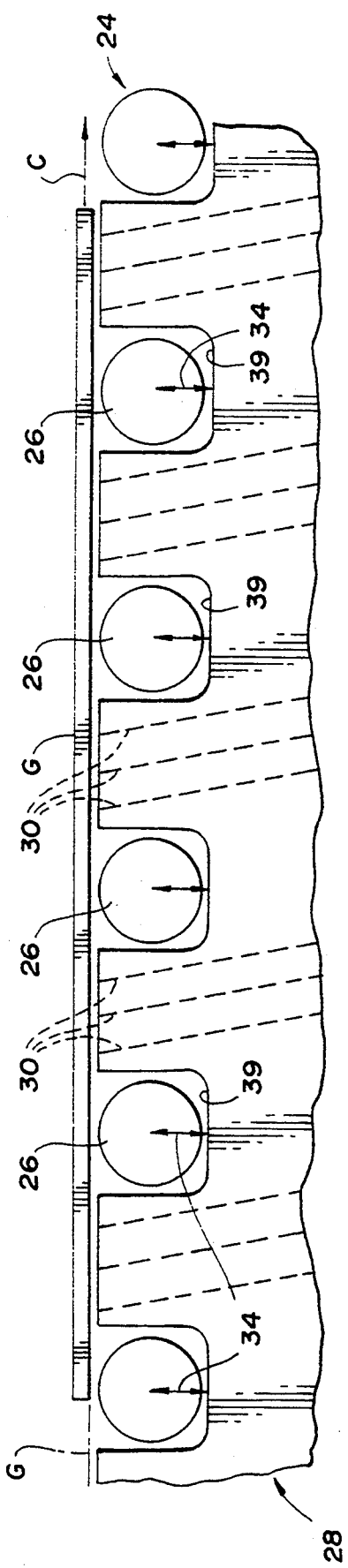

HEATED GLASS SHEET POSITIONING ON ROLL CONVEYOR

TECHNICAL FIELD

This invention relates to apparatus and a method for positioning a heated glass sheet on a roll conveyor.

BACKGROUND ART

One way of conveying heated glass sheets is on a roll conveyor whose rolls thus engage and support the lower softened surface of the heated glass during the conveyance as the rolls rotate. This type of conveyance can be a continuation of a roll conveyor on which the glass sheet is heated to the softened condition for tempering or can receive the heated glass sheet from another type of a conveyor such as an air hearth conveyor on which the heating is performed. Regardless of what type of heating is utilized, the distance of conveyance necessary to heat the glass sheet to its softened condition normally requires that there be some repositioning of the glass sheet on the roll conveyor prior to being transferred therefrom to further processing apparatus such as a mold on which the heated glass sheet is to be bent, such that the positioning provides the proper location of the glass sheet on the mold for the bending. Such positioning of heated glass sheets on roll conveyors has previously been performed by moving the glass sheet with its lower softened surface directly sliding across the conveyor rolls such as disclosed by U.S. Pat. Nos. 4,282,026 McMaster et al; 4,364,766 Nitschke; 4,437,872 McMaster et al; and 4,475,937 Nitschke.

DISCLOSURE OF INVENTION

An object of the present invention is to provide improved apparatus and an improved method for positioning a heated glass sheet on a roll conveyor.

In carrying out the above object, the glass sheet roll conveyor apparatus of the invention includes a roll conveyor having spaced rolls for conveying a heated glass sheet in a direction of conveyance and also includes an air hearth having openings for supplying upwardly directed pressurized air between the conveyor rolls. An elevator of the apparatus provides relative vertical movement between the rolls of the roll conveyor and the air hearth between: (a) a first position where the heated glass sheet is supported on the rolls for conveyance, and (b) a second position where the rolls are located at a lower position relative to the air hearth than in the first position such that upwardly directed pressurized air supplied by the air hearth floats the heated glass sheet above the rolls. A positioner of the apparatus positions the heated glass sheet while floated above the conveyor rolls by the air hearth to allow subsequent support and conveyance of the heated glass sheet on the rolls at a desired position to facilitate subsequent processing such as bending on a mold which requires that the glass be properly positioned to provide the bending to the designed shape.

In the preferred construction of the glass sheet roll conveyor apparatus, the air hearth has stationary supports and the elevator has at least one actuator that moves the rolls of the roll conveyor vertically with respect to the stationary air hearth between: (a) the first position where the rolls are raised with respect to the stationary air hearth to support and convey the heated glass sheet, and (b) the second position where the rolls are lowered with respect to the stationary air hearth such that the upwardly directed air supplied by the air hearth supports the glass sheet above the rolls for positioning by the positioner.

In its preferred construction, the glass sheet roll conveyor apparatus also has its elevator provided with a cam mechanism that provides the relative vertical movement between the rolls of the roll conveyor and the air hearth between the first and second positions. The preferred construction of the roll conveyor includes: a pair of roll support members, a pair of continuous drive loops that have driving reaches respectively movable over the pair of roll support members with the rolls supported thereon for rotational driving, and a drive for respectively moving the pair of drive loops over the pair of roll supports to rotatively drive the rolls. The air hearth as mentioned above has stationary supports so as to remain stationary, and the cam mechanism of the elevator includes a plurality of cam actuators that move the pair of roll support members vertically to provide the movement of the rolls between the first raised position and the second lowered position with respect to the stationary air hearth. Each cam actuator is disclosed as including a cam that engages and moves one of the roll support members and also includes a cam operator that moves the cam thereof to provide the movement of the rolls between the first raised position and the second lowered position with respect to the stationary air hearth. The pair of roll support members have flat follower surfaces engaged by the cams of the cam actuators, and the cams move generally parallel to the flat follower surfaces adjacent the first raised position of the rolls where the rolls move out of and into engagement with the heated glass sheet before and after the positioning.

In its preferred construction, the positioner of the glass sheet roll conveyor apparatus includes a shuttle that moves along the direction of conveyance above the roll conveyor in opposite direction for a positioning stroke in the direction of conveyance and a return stroke opposite to the direction of conveyance. A locator of the positioner is provided on the shuttle for moving the heated glass sheet with respect thereto and with respect to the roll conveyor. The shuttle has stops against which the heated glass sheet is positioned by the locator, and a stop operating mechanism of the positioner moves the stops down for the positioning stroke of the shuttle to provide the positioning of the heated glass sheet and moves the stops up for the return stroke of the shuttle.

Two embodiments of shuttle locator are disclosed. In one embodiment, the locator on the shuttle is constructed as a heated air ejector from which heated air under pressure is supplied to move the heated glass sheet into engagement with the shuttle stops. In another embodiment, the locator on the shuttle is constructed as a pusher having a pusher member and a pusher operator mechanism for moving the pusher member: downwardly for the positioning stroke of the shuttle, horizontally during the positioning stroke to position the heated glass sheet against the stops, and upwardly for the return stroke of the shuttle. More specifically, the pusher operator mechanism includes a vertical operator that moves the pusher member up and down and also includes a horizontal operator that moves the pusher member horizontally. Furthermore, the pusher includes a pivotal member that supports the pusher member on the shuttle for swinging movement under the impetus of the horizontal operator.

As disclosed, the air hearth of the apparatus has openings that are inclined in a direction that is opposite to the direction of the conveyance such that the upwardly directed pressurized air that floats the heated glass sheet cooperates with the locator in moving the heated glass sheet into engagement with the shuttle stops during the positioning stroke of the shuttle.

In carrying out another object of the invention, the method for heated glass sheet roll conveyor positioning is performed by conveying a heated glass sheet on rolls of a roll conveyor and providing relative vertical movement in a first direction between the rolls and an air hearth, which supplies upwardly directed pressurized air between the rolls, such that the rolls are located lower relative to the air hearth than during the heated glass sheet conveyance on the rolls to allow upwardly directed pressurized air from the air hearth to float the heated glass sheet above the rolls. The heated glass sheet is then positioned at a desired position with respect to the rolls of the roll conveyor while floated by the upwardly directed pressurized air from the air hearth. Subsequent relative vertical movement is provided in a second direction opposite to the first direction between the rolls and the air hearth to again support and convey the heated glass sheet on the rolls after the positioning.

This floating type positioning of the heated glass sheet with respect to the roll conveyor prevents any distortion of the lower glass sheet surface in its softened condition while heated.

In the preferred practice of the method for heated glass sheet roll conveyor positioning, the rolls of the roll conveyor are moved downwardly and upwardly relative to the air hearth, which remains stationary, to provide the relative vertical movement in the first and second directions. The preferred practice of the method for heated glass sheet roll conveyor positioning also positions the heated glass sheet against stops on a moving shuttle by a locator also mounted on the shuttle. In one practice of the method for heated glass sheet roll conveyor positioning, the locator ejects heated air to position the heated glass sheet against the stops on the moving shuttle. In another practice of the method for heated glass sheet roll conveyor positioning, the locator moves a pusher member to engage and move the heated glass sheet against the stops on the moving shuttle.

As disclosed, the method for heated glass sheet roll conveyor positioning has the air hearth supplying upwardly directed pressurized air that is inclined in a direction that is opposite to the direction of conveyance of the roll conveyor to assist in the positioning. The inclined upwardly directed pressurized air provides this assistance in the positioning by moving the heated glass sheet against the stops on the moving shuttle in cooperation with the locator.

The objects, features and advantages of the present invention are readily apparent from the following detailed description of the best modes for carrying out the invention when taken in connection with the accompanying drawings.

BRIEF DESCRIPTION OF THE DRAWINGS

FIG. 1 is an elevational cross-sectional view taken partially in section through a glass sheet roll conveyor furnace having apparatus according to the present invention for positioning a heated glass sheet on rolls of the roll conveyor;

FIG. 2 is a side elevational view of the glass sheet roll conveyor apparatus taken generally along the direction of line 2—2 in FIG. 1;

FIG. 3 is a partial side elevational view taken in the same direction as FIG. 2 and illustrates the heated glass sheet while being conveyed on rolls of the roll conveyor;

FIG. 4 is a partial side elevational view similar to FIG. 3 but illustrating the heated glass sheet being floated by upwardly directed pressurized air from an air hearth to allow the positioning of the heated glass sheet while out of engagement with the rolls of the roll conveyor;

BEST MODES FOR CARRYING OUT THE INVENTION

Figure 5:
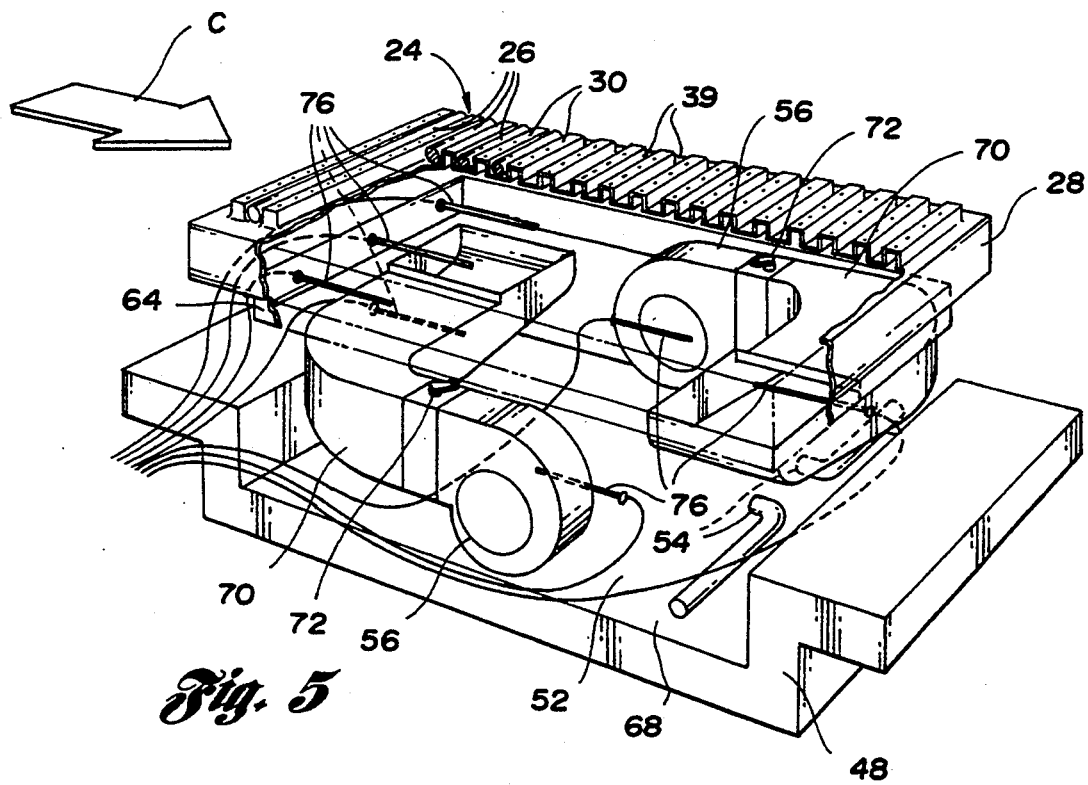
FIG. 5 is a broken away perspective view of the air hearth illustrating blowers, dampers, and a plenum that feed pressurized air to the air hearth to supply the upwardly directed pressurized air that floats the heated glass sheet.

With reference to FIG. 1 of the drawings, a furnace generally indicated by 20 includes glass sheet roll conveyor apparatus 22 constructed in accordance with the invention and operable to perform the method of the invention as is hereinafter more fully described.

With further reference to FIGS. 2–6, the apparatus 22 includes a roll conveyor 24 having spaced rolls 26 for conveying a heated glass sheet G in a direction of conveyance as shown by arrow C in FIGS. 3 and 4. An air hearth 28 of the apparatus has openings 30 for supplying upwardly directed pressurized air between the conveyor rolls 26. An elevator 32 of the apparatus is illustrated best in FIG. 7 and is operable to provide relative vertical movement between the rolls 26 of the roll conveyor 24 and the air hearth 28 as illustrated by arrows 34 in FIGS. 3 and 4. This relative vertical movement provides location of the rolls 26 of the roll conveyor 24 and the air hearth 28 between: (a) a first position as illustrated in FIG. 3 where the heated glass sheet G is supported on the rolls 26 for conveyance, and (b) a second position as illustrated in FIG. 4 where the rolls 26 are located at a lower position relative to the air hearth 28 than in the first position such that upwardly directed pressurized air supplied by the air hearth floats the heated glass sheet G above the rolls. A positioner 36 illustrated in FIGS. 6 and 11 positions the heated glass sheet while floated as illustrated in FIG. 4 above the rolls 26 by the air hearth 28 to allow subsequent support and conveyance of the heated glass sheet on the rolls at a desired position.

The positioning of the heated glass sheet as described above thus takes place without any engagement between the lower softened surface of the glass sheet and the rolls 26 so that there cannot be any marring or scratching of the glass by the rolls. This positioning allows for relative positioning of a pair of glass sheets with respect to each other as well as with respect to the roll conveyor both longitudinally and laterally so that each glass sheet will be properly positioned for subsequent processing such as upon being received by a mold from the roll conveyor for bending. Furthermore, during the transfer between the roll conveyor support and air hearth floating support, the apparatus is designed to maintain the lower surface of the heated glass sheet at the same plane of conveyance 37 (FIGS. 3 and 4) so as to facilitate the positioning and transfer between these two modes of support.

As illustrated in FIGS. 1 and 2, the air hearth 28 has stationary corner supports 38 for providing mounting thereof in a stationary relationship with respect to the factory floor 40. Laterally extending grooves 39 of the air hearth 28 receive the rolls 26 of the roll conveyor as best shown in FIGS. 3 and 4. The rolls 26 and the air hearth 28 are preferably made of rebonded fused silica particles so as to have good resistance to thermal warpage, and each roll center has a larger diameter than the roll ends so as to have a barrel shape such that the upper sides of the rolls define a plane of conveyance even though the centers of the rolls sag downwardly between their ends due to gravity. Furthermore, as illustrated in FIG. 7, the elevator 32 has at least one actuator 42 that moves the rolls 26 of the roll conveyor 24 vertically with respect to the stationary air hearth 28 within the grooves 39. This vertical movement as previously described more generally is between: (a) the first position of FIG. 3 where the rolls 26 are raised with respect to the stationary air hearth 28 within the grooves 39 thereof to support and convey the heated glass sheet G, and (b) the second position of FIG. 4 where the rolls 26 are lowered with respect to the stationary air hearth 28 within the grooves 39 thereof such that the upwardly directed pressurized air supplied by the air hearth supports the heated glass sheet above the rolls for the positioning by the positioner 36 shown in FIGS. 6 and 11.

With reference to FIGS. 1 and 2, furnace 20 includes a framework generally indicated by 44 on the factory floor 40. A housing 46 of the furnace 20 is mounted within the framework 44 and includes lower and upper housing portions 48 and 50 that define a heated chamber 52 within which the positioner 36 provides the roll conveyor positioning of the heated glass sheet as previously described and as is more fully hereinafter described.

As illustrated in FIG. 5, the lower housing portion 48 receives heated air from supplies 54 such as may be provided by the products of combustion from a gas burner. These heated air supplies 54 are located below the air hearth 28 within the heated chamber 52 which also receives a pair of hot air blowers 56 which have external drives 58 located outside of the heated chamber as illustrated in FIG. 2. More specifically, each drive 58 includes an electric motor 60 driving a belt 61 that drives a pulley 62 on the outer external end of a shaft whose inner end drives the associated blower 56 within the heated chamber 52 of the housing. Below the air hearth 28, an upwardly opening plenum 64 is mounted by supports 66 (FIG. 2) extending upwardly from the floor 68 of the lower housing portion 48. Ducts 70 of the plenum 64 feed heated and pressurized air from the blowers 56 to the lower side of the air hearth 28 so as to provide upwardly directed pressurized air therethrough for floating the heated glass sheet as previously described in connection with FIG. 4. Dampers 72 control the flow of the heated and pressurized air along ducts 70 from the blowers 56 to the plenum 64 and have external operators 74 shown in FIG. 2 for opening and closing of the dampers. The dampers thus allow the blowers 56 to continue to operate but prevent the heated and pressurized air flow to the air hearth 28 until the appropriate time at which the glass sheet is to be floated for the positioning operation. After completion of the positioning as is hereinafter more fully described, the rolls 26 are again moved upwardly and the dampers 72 are closed so that the glass sheet is again supported by the rolls for conveyance at the proper location with respect to the roll conveyor.

As also illustrated in FIG. 5, temperature probes 76 within the heated chamber 52 below the air hearth 28 sense the temperature at various locations to insure that there is the proper extent of heating.

With reference back to FIG. 1, the upper housing portion 50 has a counterbalance mechanism 78 including chains 80 that extend downwardly from the upper extent of the framework 44 to suspend the upper housing portion above the roll conveyor apparatus 22 on which the heated glass sheet positioning takes place. The upper housing portion 50 has electric resistance heaters 81 mounted within its semicircular shape to provide heating of the chamber 52.

Figure 7:
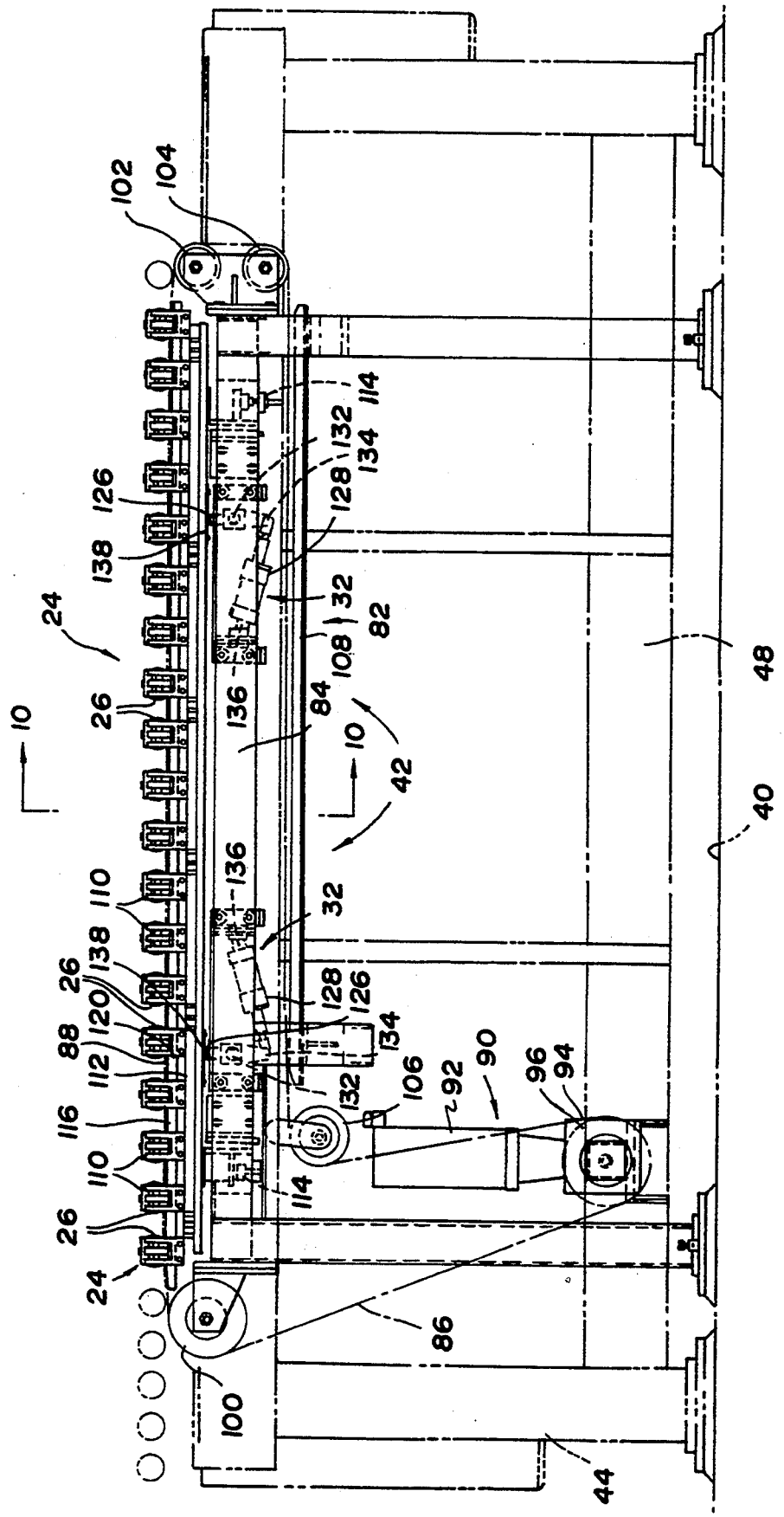
FIG. 7 is a side elevational view of the roll conveyor and illustrates the construction of an elevator for providing the relative vertical movement between the rolls of the roll conveyor and the associated air hearth that provides the upwardly directed pressurized air for floating the heated glass sheet above the rolls.
Figure 8:
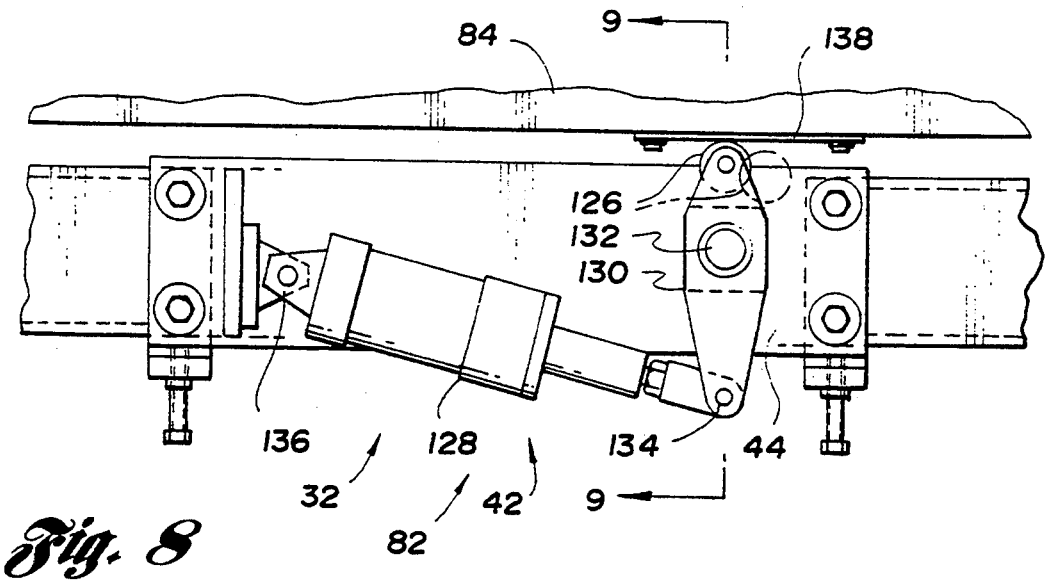
FIG. 8 is a side elevational view of a cam actuator of the elevator for providing the relative vertical movement preferably by raising and lowering the rolls of the roll conveyor with respect to the air hearth which remains stationary.
Figure 9:
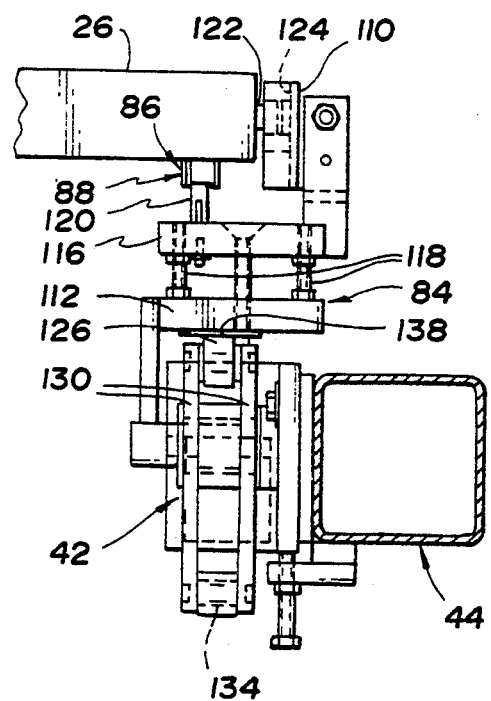
FIG. 9 is a view taken along the direction of line 9—9 in FIG. 8 to illustrate the construction of the cam actuator.

As best illustrated in FIGS. 7-9, the elevator 32 preferably includes a cam mechanism 82 that provides the relative vertical movement between the rolls 26 of the roll conveyor 24 and the air hearth 28 between the first and second positions respectively shown by FIGS. 3 and 4 as previously described. Roll conveyor 24 includes a pair of roll support members 84 as shown in FIG. 1 and also has a pair of continuous drive loops 86 that are preferably embodied by chains. The pair of continuous drive loops 86 have driving reaches 88 as shown in FIG. 7 movable over the pair of roll support members 84 with the rolls 26 supported thereon for rotational driving at the opposite ends of the rolls. A drive 90 of the roll conveyor respectively moves the pair of drive loops 86 over the pair of roll support members 84 to rotatively drive the rolls 26. The air hearth 28 as previously mentioned has stationary supports 38 so as to remain stationary with respect to the factory floor 40. Cam mechanism 82 of the elevator 32 includes a plurality of the actuators 42 which are cam actuators that move the pair of roll support members 84 vertically to provide the movement of the rolls 26 between the first raised position and the second lowered position with respect to the stationary air hearth as respectively shown by FIGS. 3 and 4 as previously discussed.

As shown in FIGS. 1 and 7, the conveyor drive 90 includes an electric motor 92 mounted on the framework 44 and driving a gear unit 94 whose output drives a pair of chain sprockets 96 connected by a cross shaft 98 mounted by bearings 99 at the opposite sides of the conveyor. The chain type drive loops 86 are received by the driving sprockets 96 as best illustrated in FIG. 7 and by an upstream sprocket 100 rotatably mounted on the framework as well as by a pair of upper and lower downstream sprockets 102 and 104 and by a sprocket 106 above the drive sprocket 96. Between the sprockets 104 and 106, each drive loop 86 slides along a return guide 108 mounted on the framework. Sprocket 106 is most preferably provided with a pneumatic or other spring bias for maintaining the proper extent of tension along the return reach of the chain below the driving reach 88. Adjacent each driving reach 88, roll positioners 110 are mounted on the adjacent roll support member 84 so as to locate the rolls against movement along the direction of conveyance as is hereinafter more fully described. Counterclockwise driving of the sprockets 96 pulls the chain from the right toward the left as viewed in FIG. 7 to rotate the rolls 26 clockwise and thereby provides heated glass sheet conveyance from the left toward the right.

Figure 10:
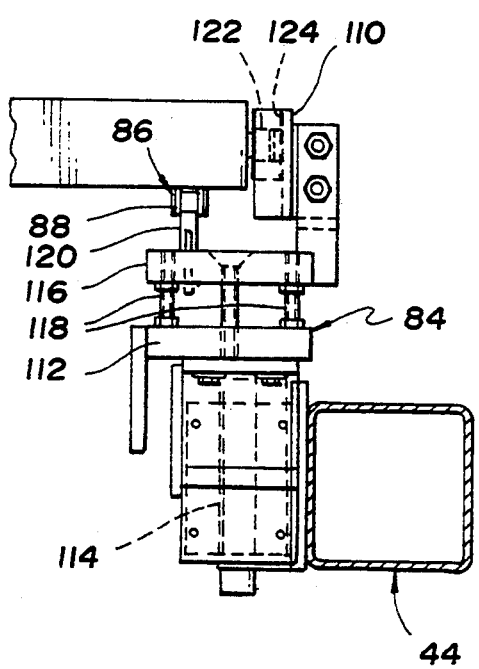
FIG. 10 is a sectional view taken along the direction of line 10—10 in FIG. 7 to illustrate the manner in which ends of the rolls are driven to provide the heated glass sheet conveyance.

As illustrated by FIGS. 9 and 10, each roll support member 84 includes a lower portion 112 whose vertical position with respect to the framework 44 is controlled by the cam actuators 42 as illustrated in FIG. 9 and whose horizontal location is controlled by guides 114 as illustrated in FIG. 10. Each roll support member 84 also has an upper portion 116 whose vertical position is adjustable by adjusters 118. A guide 120 mounted on the upper portion 116 of each support member 84 slidably supports the driving reach 88 of the associated drive loop 86 with the adjacent end of the roll 26 supported thereon for driving rotation. Each roll positioner 110 is also mounted on the upper portion 116 of the associated support member 84 and receives a central pin 122 that projects axially from the roll to provide the positioning. This positioning is provided with the pin 122 received by an inwardly opening vertical slot 124 in the positioner 110.

As illustrated in FIG. 8, each cam actuator 42 includes a cam 126 that engages and moves an associated one of the pair of roll support members 84 vertically between the raised and lowered positions as previously described. Each cam actuator 42 also includes a cam operator 128 that moves the cam 126 thereof to provide the movement of the rolls between the first raised position and the second lowered position with respect to the stationary air hearth as previously described in connection with FIGS. 3 and 4. More specifically, each cam 126 as shown in FIG. 8 is mounted on one end of a cam lever 130 which has a pivotal support 132 on the framework 44. At its opposite end from the cam 126, the cam lever 130 has a connection 134 to the cam operator 128 which is preferably embodied by a cylinder whose other end has a mounting connection 136 to the framework 44. Retraction of the cylinder type cam operator 128 pivots the cam lever 130 clockwise to move the cam 126 downwardly such that the support member 84 moves the rolls from the raised position to the lowered position. Extension of the cylinder type cam operator 128 pivots the cam lever 130 counterclockwise to move the cam 126 upwardly to move the rolls from the lowered position to the raised position with respect to the air hearth as previously described.

With reference to FIGS. 8 and 9, the pair of roll support members 84 have flat follower surfaces 138 engaged by the cams 126 of the cam actuators 42. The cams 126 move generally parallel to the flat follower surfaces 138 adjacent the first raised position of the rolls where the rolls move out of and into engagement with the heated glass sheet before and after the positioning.

Figure 6:
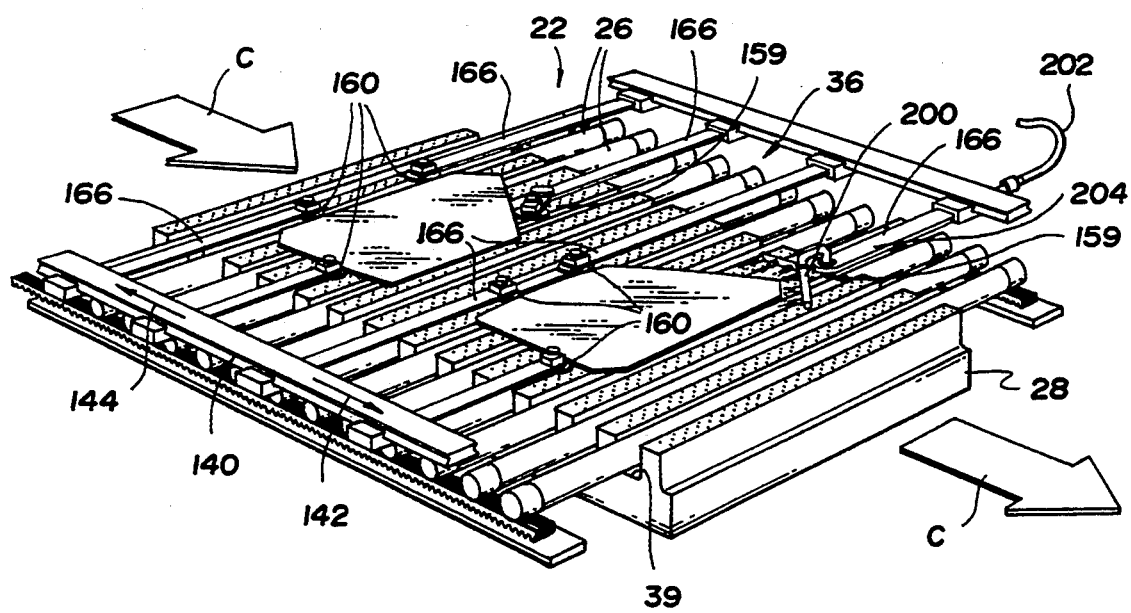
FIG. 6 is a partial perspective view illustrating a positioner that positions the heated glass sheet while floated by the air hearth above the rolls of the roll conveyor.
Figure 11:
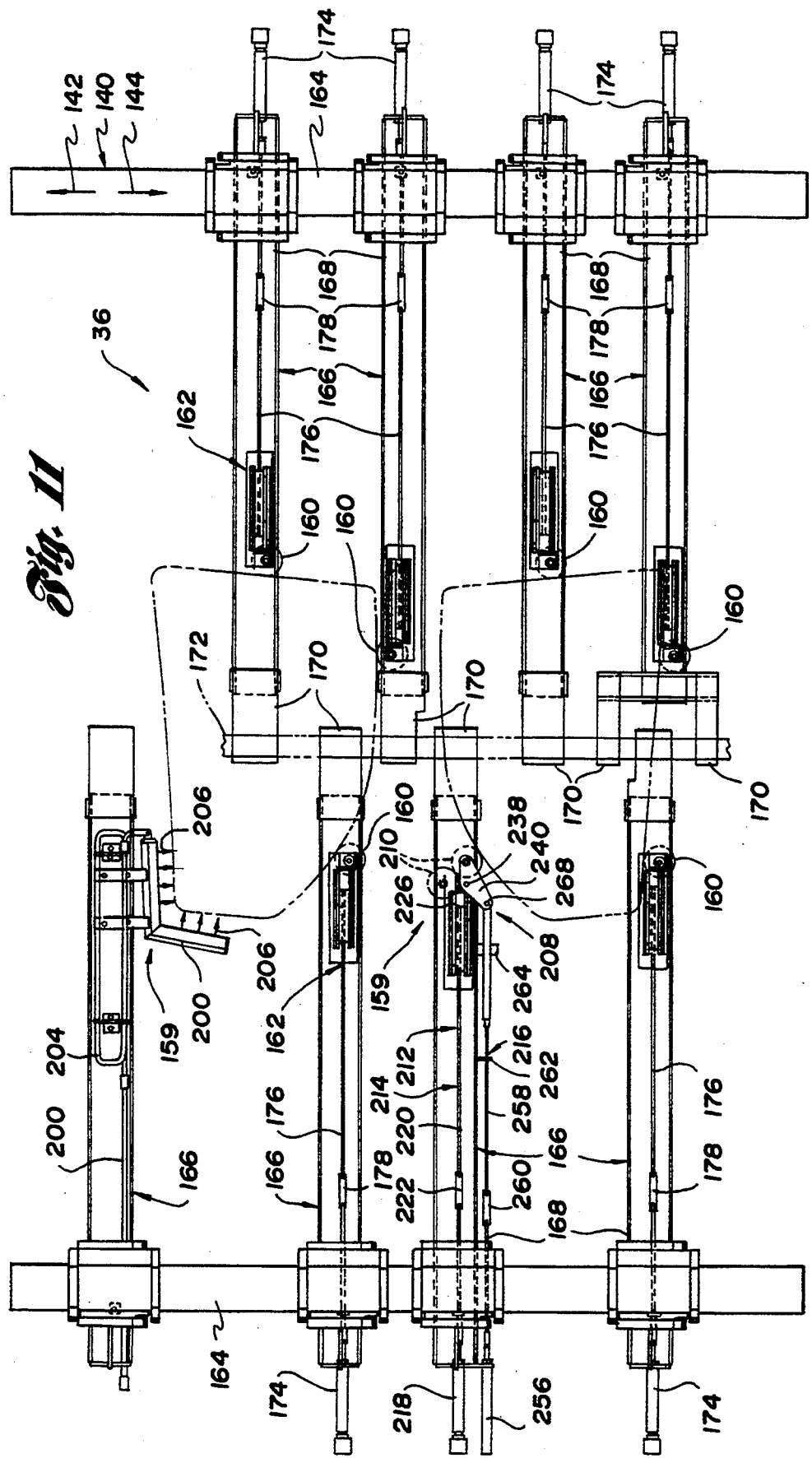
FIG. 11 is a top plan view of the heated glass sheet positioner taken generally along the direction of line 10—10 in FIG. 1.

As illustrated in FIGS. 1, 2, 6 and 11, the positioner 36 includes a shuttle 140 that moves along the direction of conveyance above the roll conveyor 24 in opposite directions for a positioning stroke in the direction of conveyance and a return stroke opposite to the direction of conveyance as respectively illustrated by arrows 142 and 144 in FIGS. 2, 6 and 11. Shuttle 140 has an electric drive motor 146 illustrated in FIG. 1 and is connected through gear units 148 and a cross shaft 150 with vertical shafts 152 whose lower ends respectively drive a pair of gear units 154 that drive linear actuators 156 having connections 158 to the shuttle 140 so as to provide the movement thereof along the direction of conveyance for the positioning and return strokes as previously described.

As illustrated in FIGS. 6 and 11, the positioner 36 includes a locator 159 and actually has a pair of the locators such that two heated glass sheets can be simultaneously positioned such as is necessary for depositing a pair of heated glass sheets on a two part mold for simultaneous bending. These two locators 159 are illustrated with different constructions for best use with different shapes of heated glass sheets to be positioned as is hereinafter more fully described.

Shuttle 140 as best illustrated in FIGS. 11-14 also has stops 160 against which the heated glass sheet G is positioned by the locator 160. A stop operating mechanism 162 moves the stops 160 down from the raised position of FIG. 13 to the lowered position of FIG. 14 for the positioning stroke to provide the positioning of the heated glass sheet and moves the stops up to the position of FIG. 13 for the return stroke so that the stops can move over the next glass sheet to be positioned during the next positioning stroke.

As illustrated in FIG. 11, the shuttle 140 has a pair of shuttle members 164 extending longitudinally with respect to the direction of conveyance at each lateral side of the shuttle. Arms 166 have outer ends 168 supported by the shuttle members 164 and have inner ends 170 that extend upwardly as shown in FIG. 1 and are supported by a longitudinally extending beam 172 of the shuttle. The locators 159 and stops 160 are mounted on the arms 166 adjacent their inner ends 170 at a location above the roll conveyor to provide the positioning operation.

Figure 12:
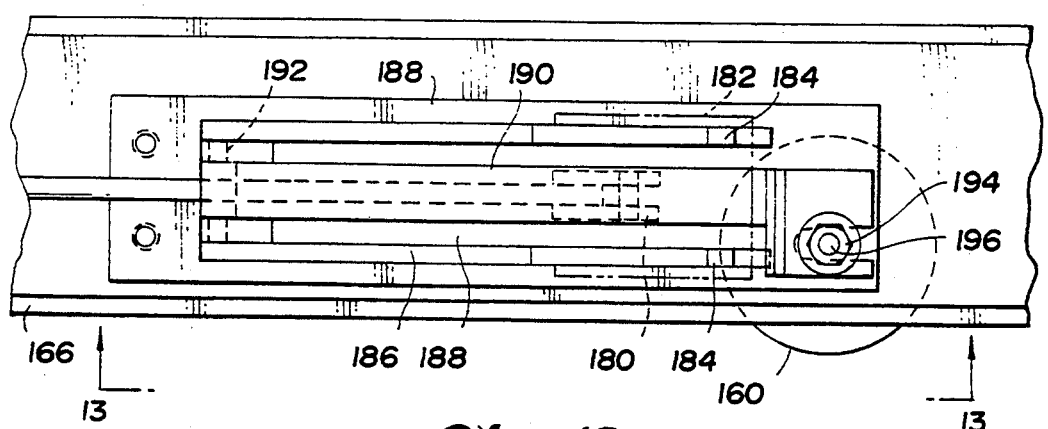
FIG. 12 is an enlarged top plan view illustrative of stops that are movable vertically on a shuttle of the positioner during the heated glass sheet positioning cycle.
Figure 13:
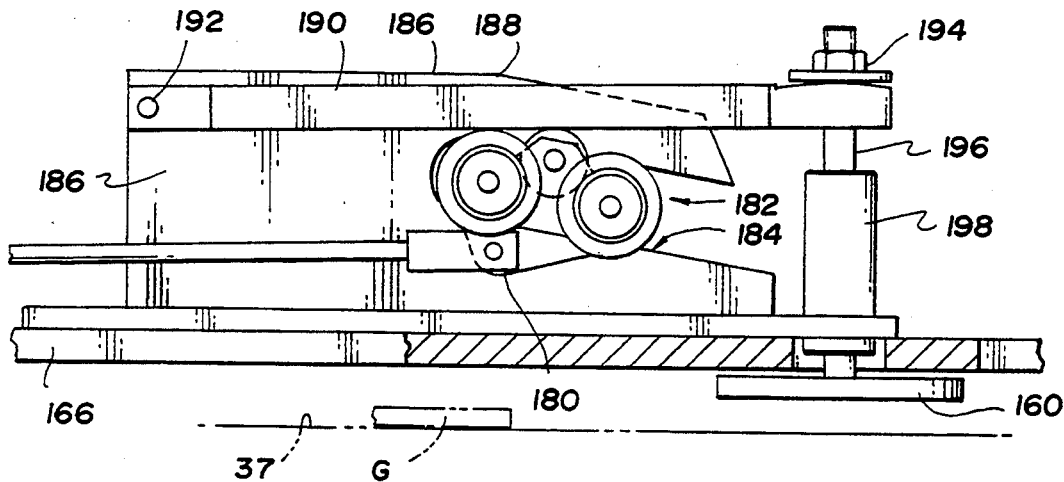
FIG. 13 is an elevational view taken along the direction of line 13—13 in FIG. 12 and illustrates the stop in a raised position which the stop occupies during a return stroke of the shuttle after a positioning stroke so as to move above the conveyed glass sheet on the roll conveyor.
Figure 14:
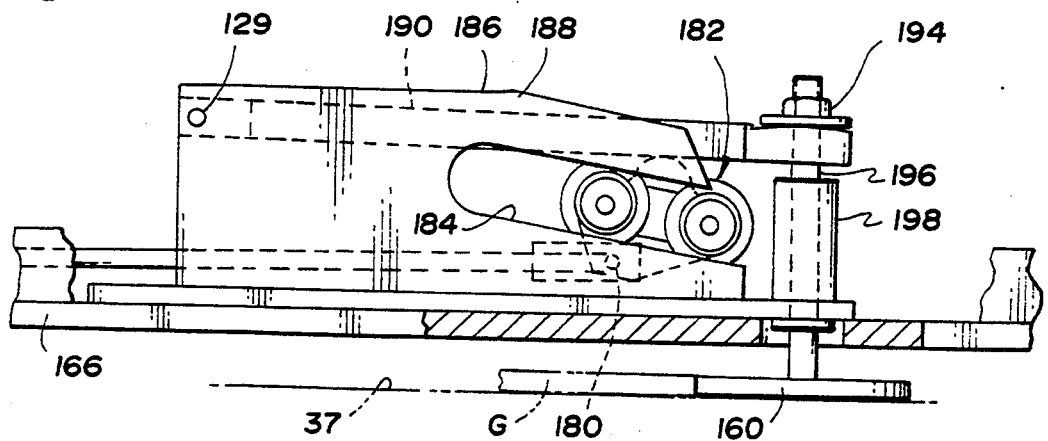
FIG. 14 is a view similar to FIG. 13 but illustrating the stop in a lowered position for engaging the heated glass sheet to provide its positioning during a positioning stroke of the shuttle.
Figure 15:
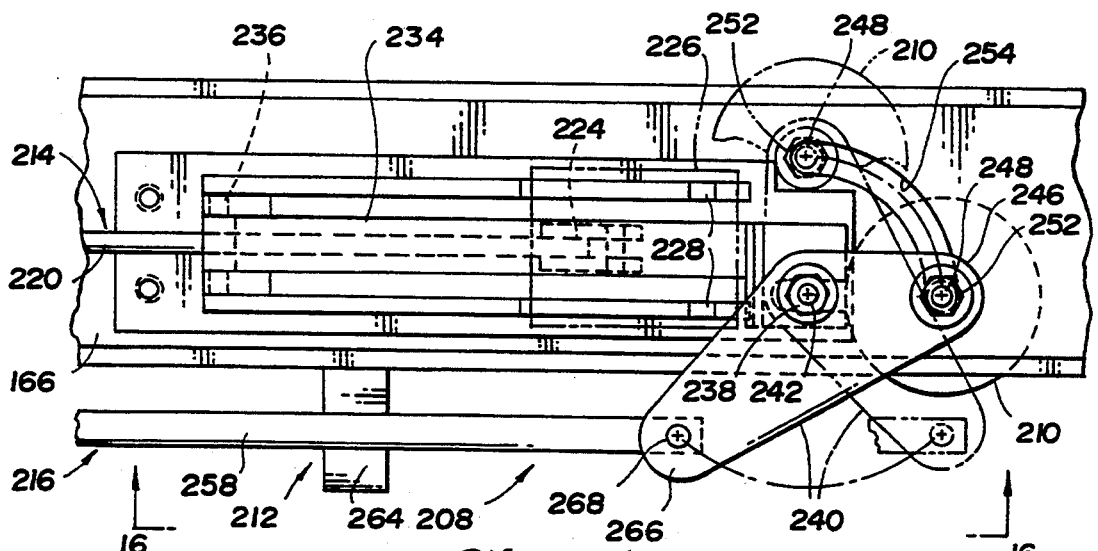
FIG. 15 is a partial top plan view of one embodiment of a locator which includes a vertically and horizontally movable pusher member utilized in the heated glass sheet positioning operation.
Figure 16:
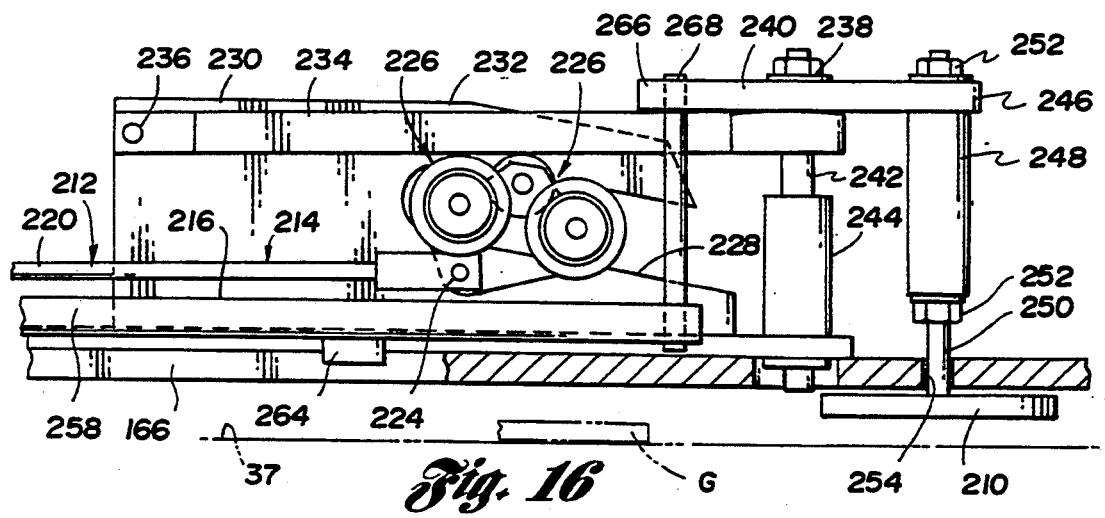
FIG. 16 is an elevational view of the pusher member and an associated pusher operator mechanism taken along the direction of line 16—16 in FIG. 15 and illustrated with the pusher member in a raised position which it occupies during a return stroke of the shuttle in preparation for each positioning cycle.
Figure 17:
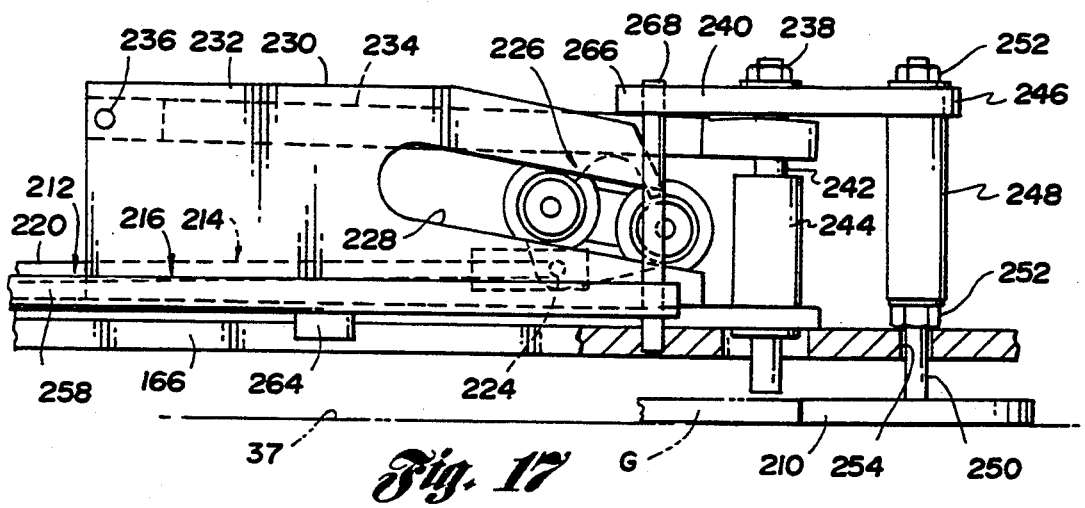
FIG. 17 is an elevational view of the pusher member and pusher operator mechanism similar to FIG. 16 but with the pusher member in a lowered position which it occupies during a positioning stroke of the shuttle when the heated glass sheet is positioned while floated above the rolls of the conveyor by the air hearth.

With continuing reference to FIGS. 11–16, the stop operating mechanism 162 associated with each stop 160 includes a cylinder actuator 174 mounted outboard of the adjacent shuttle member 164 and having a piston connecting rod actuated connector 176 extending inwardly to the associated stop 160. Each connector 176 as illustrated in FIG. 11 preferably has a suitable length adjuster 178 such as of the threaded type and, as illustrated in FIGS. 12–14 has an inner end connection 180 to a cam assembly 182 that is moved along an inclined guide slot 184 of a guide member 186 mounted on the arm 160. This guide member 186 includes a pair of spaced guide portions 188 as illustrated in FIG. 12 with each portion having a guide slot 184 aligned with the slot of the other portion and with the cam assembly 182 mounted between the pair of guide portions. A follower 190 is also located between the pair of guide portions 188 and has one end mounted by a pivotal connection 192 on the guide member and has another end with a connection 194 to the upper end of a stop connector 196 that extends downwardly through a bushing 198 on the arm 166 to the stop 160. Intermediate its ends, the follower 190 is engaged as best illustrated in FIG. 13 by the cam assembly 182 that is movable along the inclined guide slot 184. Movement of the connector 176 by the cylinder actuator previously described moves the cam assembly 182 between the position of FIG. 13 and the position of FIG. 14 along the inclined guide slot 184 of the guide member 186 mounted on the arm 166. This movement of the cam assembly 182 moves the follower 190 upwardly and downwardly in a pivotal manner about its connection 192 such that the connection 194 moves the stop connector 196 upwardly and downwardly through the bushing 198 and thereby moves the stop 160 downwardly from the position of FIG. 13 to the position of FIG. 14 for the positioning stroke of the shuttle and subsequently upwardly to the raised position of FIG. 13 for the return stroke.

As illustrated in FIG. 6 and 11, one of the locators 159 comprises a heated air ejector 200 from which heated air under pressure is supplied to move the adjacent heated glass sheet G into engagement with the associated shuttle stops 160 during the positioning stroke of the shuttle along the direction of conveyance. This heated air ejector 200 includes a supply conduit 202 through which air is supplied and also includes a coil 204 through which the air flows prior to passage to the ejector 200 so as to be heated within the heated chamber 52 of the furnace. The pressurized and heated air is supplied through openings from the ejector 200 in alignment with the edge of the heated glass sheet as illustrated best by arrows 206 in FIG. 11 to provide the positioning against the associated stops 160 in their lower position as previously described in connection with FIGS. 12–14.

With reference to FIGS. 11 and 15–17, the other locator 159 comprises a pusher 208 having a pusher member 210 and a pusher operator mechanism 212 for moving the pusher member. This pusher operator mechanism 212 moves the pusher member 210 downwardly for the positioning stroke of the shuttle generally in the same manner as the previously described stops 160 discussed in connection with FIGS. 12–14 as well as horizontally during the positioning stroke to engage and position the heated glass sheet against the stops prior to moving the pusher member upwardly for the return stroke of the shuttle. More specifically, the pusher operator mechanism 212 includes a vertical operator 214 that moves the pusher member 210 up and down between the positions of FIGS. 16 and 17 and includes a horizontal operator 216 that moves the pusher member horizontally from the phantom line indicated position of FIG. 15 to the solid line indicated position to provide the engagement and positioning of the associated heated glass sheet against the stops.

The vertical operator 214 of the pusher operator mechanism 210 includes a pneumatic cylinder type actuator 218 mounted on the outer end 268 of the associated arm 166 outboard from the adjacent shuttle member 164. A piston connection rod connector 220 is moved by the actuator 218 and has a length adjuster 222 such as of the threaded type as well as having an inner end connection 224 to a cam assembly 226 received by an inclined guide slot 228 in a guide member 230 mounted on the inner end of the associated arm 166. This guide member 230 includes a pair of spaced guide portions 232 between which the cam assembly connection 224 is located along with a follower 234. One end of the follower 234 has a connection 236 to the guide portions 232 of guide member 230 and another end thereof includes a pivotal connection 238 that mounts a pivotal member 240 of the pusher for supporting the pusher member 210 on the shuttle for swinging movement under the impetus of the horizontal operator 216. More specifically, the pivotal connection 238 has a downwardly projecting pintle 242 that extends through a bushing 244 on the associated shuttle arm 166 so as to be mounted for upward and downward movement as the follower 234 is moved upwardly and downwardly by the cam assembly under the impetus of the pneumatic cylinder type actuator through its connector 220 much like the vertical stop movement previously described. In addition, the pivotal member 240 mounted by the pintle 242 of the pivotal connection 238 has one lobe 246 that supports a downwardly depending pusher support 248 whose lower end 250 is secured to the pusher member 210. A pair of nuts 252 allow adjustment of the vertical height of the pusher member 210, and the pusher support lower end 250 extends through an arcuate slot 254 in the arm 166 to guide the horizontal movement between the phantom and solid line indicated positions of FIG. 15 as the heated glass sheet positioning is provided.

The horizontal operator 216 of the pusher operator mechanism 210 includes a pneumatic cylinder type actuator 256 that is shown in FIG. 11 as being mounted adjacent the actuator 218 of the vertical operation 214 and has a connector 258, with a length adjuster 260 such as of the threaded type, extending from its piston connecting rod inwardly toward the pusher 208. This connector 258 extends through a suitable opening in a support flange 262 on the associated shuttle arm 166 and is also slidably supported on a support flange 264 of the shuttle arm adjacent the pivotal member 240 shown in FIG. 15. Another lobe 266 of the pivotal member 240 has a connection 268 to the actuator connector 258 so as to actuate the pivotal movement of member 240 and the resultant horizontal movement of pusher member 210.

As best illustrated in FIGS. 2–4, the air hearth 28 has its openings 30 inclined in a direction opposite to the direction of conveyance to assist in the glass sheet positioning. This positioning assistance is provided by the upwardly inclined pressurized air moving the heated glass sheet into engagement with the stops 160 in cooperation with the positioning provided by the associated locator 159.

The foregoing description of the apparatus is also fully descriptive of the method for heated glass sheet roll conveyor positioning such that no further description of the method is necessary.

While the best modes for carrying out the invention have been described in detail, those familiar with the art to which this invention related will recognize various alternative designs and embodiments for carrying out the invention as defined by the following claims.

What is claimed is:

1. Glass sheet roll conveyor apparatus, comprising:
   a roll conveyor having spaced rolls for conveying a heated glass sheet in a direction of conveyance;
   an air hearth having openings for supplying upwardly directed pressurized air between the conveyor rolls;
   an elevator for providing relative vertical movement between the rolls of the roll conveyor and the air hearth between: (a) a first position where the glass sheet is supported on the rolls for conveyance, and (b) a second position where the rolls are located at a lower position relative to the air hearth than in the first position such that upwardly directed pressurized air supplied by the air hearth floats the heated glass sheet above the rolls; and
   a positioner for positioning the heated glass sheet while floated above the conveyor rolls by the air hearth to allow subsequent support and conveyance of the heated glass sheet on the rolls at a desired position.

2. Glass sheet roll conveyor apparatus as in claim 1 wherein the air hearth has stationary supports and the elevator has at least one actuator that moves the rolls of the roll conveyor vertically with respect to the stationary air hearth between: (a) the first position where the rolls are raised with respect to the stationary air hearth to support and convey the heated glass sheet, and (b) the second position where the rolls are lowered with respect to the stationary air hearth such that the upwardly directed air supplied by the air hearth supports the glass sheet above the rolls for positioning by the positioner.

3. Glass sheet roll conveyor apparatus as in claim 1 wherein the elevator includes a cam mechanism that provides the relative vertical movement between the rolls of the roll conveyor and the air hearth between the first and second positions.

4. A glass sheet roll conveyor apparatus as in claim 3 wherein the roll conveyor includes: a pair of roll support members, a pair of continuous drive loops that have driving reaches respectively movable over the pair of roll support members with the rolls supported thereon for rotational driving, and a drive for respectively moving the pair of drive loops over the pair of roll supports to rotatively drive the rolls; the air hearth having stationary supports so as to remain stationary; and the cam mechanism of the elevator including a plurality of cam actuators that move the pair of roll support members vertically to provide the movement of the rolls between the first raised position and the second lowered position with respect to the stationary air hearth.

5. Glass sheet roll conveyor apparatus as in claim 4 wherein each cam actuator includes a cam that engages and moves one of the roll support members, and each cam actuator also including a cam operator that moves the cam thereof to provide the movement of the rolls between the first raised position and the second lowered position with respect to the stationary air hearth.

6. Glass sheet roll conveyor apparatus as in claim 5 wherein the pair of roll support members have flat follower surfaces engaged by the cams of the cam actuators, and the cams moving generally parallel to the flat follower surfaces adjacent the first raised position of the rolls where the rolls move out of and into engagement with the heated glass sheet before and after the positioning.

7. A glass sheet roll conveyor apparatus as in claim 1 wherein the positioner includes a shuttle that moves along the direction of conveyance above the roll conveyor in opposite directions for a positioning stroke in the direction of conveyance and a return stroke opposite to the direction of conveyance, the positioner including a locator on the shuttle for moving the heated glass sheet with respect thereto and with respect to the roll conveyor, the shuttle having stops against which the heated glass sheet is positioned by the locator, and a stop operating mechanism for moving the stops down for the positioning stroke of the shuttle to provide the positioning of the heated glass sheet and for moving the stops up for the return stroke of the shuttle.

8. Glass sheet roll conveyor apparatus as in claim 7 wherein the locator on the shuttle comprises a heated air ejector from which heated air under pressure is supplied to move the heated glass sheet into engagement with the shuttle stops.

9. Glass sheet roll conveyor apparatus as in claim 7 wherein the locator on the shuttle comprises a pusher having a pusher member and a pusher operator mechanism for moving the pusher member: downwardly for the positioning stroke of the shuttle, horizontally during the positioning stroke to position the heated glass sheet against the stops, and upwardly for the return stroke of the shuttle.

10. Glass sheet roll conveyor apparatus as in claim 9 wherein the pusher operator mechanism includes a vertical operator that moves the pusher member up and down and also includes a horizontal operator that moves the pusher member horizontally.

11. Glass sheet roll conveyor apparatus as in claim 10 wherein the pusher includes a pivotal member that supports the pusher member on the shuttle for swinging movement under the impetus of the horizontal operator.

12. Glass sheet roll conveyor apparatus as in claim 1 wherein the air hearth has openings that are inclined in a direction opposite to the direction of conveyance.

13. Glass sheet roll conveyor apparatus, comprising:
   a roll conveyor having spaced rolls for conveying a heated glass sheet in a direction of conveyance;
   a stationary air hearth having openings for supplying upwardly directed pressurized air between the conveyor rolls;

an elevator for providing vertical movement of the rolls of the roll conveyor with respect to the stationary air hearth between: (a) a first raised position where the glass sheet is supported on the rolls for conveyance, and (b) a second lowered position where the rolls are located lower relative to the stationary air hearth than in the first position such that upwardly directed pressurized air supplied by the air hearth floats the heated glass sheet above the rolls; and a positioner for positioning the heated glass sheet while floated above the conveyor rolls by the air hearth to allow subsequent support and conveyance of the heated glass sheet on the rolls at a desired position.

14. Glass sheet roll conveyor apparatus, comprising:

a roll conveyor having spaced rolls for conveying a heated glass sheet in a direction of conveyance, the roll conveyor including a pair of roll support members and a pair of continuous drive loops that have driving reaches respectively movable over the pair of roll support members with the rolls supported thereon for rotational driving, and the roll conveyor including a drive for respectively moving the pair of drive loops over the pair of roll supports to rotatively drive the rolls;

a stationary air hearth having openings for supplying upwardly directed pressurized air between the conveyor rolls;

an elevator including a cam mechanism having cam actuators for moving the pair of roll support members vertically to move the rolls of the roll conveyor vertically with respect to the stationary air hearth between: (a) a first raised position where the glass sheet is supported on the rolls for conveyance, and (b) a second lowered position where the rolls are located at a lower position relative to the air hearth than in the first position such that upwardly directed pressurized air supplied by the air hearth floats the heated glass sheet above the rolls; and a positioner for positioning the heated glass sheet while floated above the conveyor rolls by the air hearth to allow subsequent support and conveyance of the heated glass sheet on the rolls at a desired position.

15. A method for heated glass sheet roll conveyor positioning, comprising:

conveying a heated glass sheet on rolls of a roll conveyor;

providing relative vertical movement in a first direction between the rolls and an air hearth, which supplies upwardly directed pressurized air between the rolls, such that the rolls are located lower relative to the air hearth than during the heated glass sheet conveyance on the rolls to allow the upwardly directed pressurized air from the air hearth to float the heated glass sheet above the rolls;

positioning the heated glass sheet at a desired position with respect to the rolls of the roll conveyor while floated by the upwardly directed pressurized air from the air hearth; and subsequently providing relative vertical movement in a second direction opposite to the first direction between the rolls and the air hearth to again support and conveyor the heated glass sheet on the rolls after the positioning.

16. A method for heated glass sheet roll conveyor positioning as in claim 15 wherein the rolls of the roll conveyor are moved downwardly and upwardly relative to the air hearth, which remains stationary, to provide the relative vertical movement in the first and second directions.

17. A method for heated glass sheet roll conveyor positioning as in claim 15 wherein the heated glass sheet is positioned against stops on a moving shuttle by a locator also mounted on the shuttle.

18. A method for heated glass sheet roll conveyor positioning as in claim 17 wherein the locator ejects heated air to position the heated glass sheet against the stops on the moving shuttle.

19. A method for heated glass sheet roll conveyor positioning as in claim 17 wherein the locator moves a pusher member to engage and move the heated glass sheet against the stops on the moving shuttle.

20. A method for heated glass sheet roll conveyor positioning as in claim 15 wherein the air hearth supplies upwardly directed pressurized air that is inclined in a direction opposite to the direction of conveyance on the roll conveyor to assist in the positioning.

21. A method for heated glass sheet roll conveyor positioning, comprising:

conveying a heated glass sheet on rolls of a roll conveyor;

vertically moving the rolls downwardly with respect to a stationary air hearth, which supplies upwardly directed pressurized air between the rolls, such that the rolls are located lower relative to the air hearth than during the heated glass sheet conveyance on the rolls to allow the upwardly directed pressurized air from the air hearth to float the heated glass sheet above the conveyor rolls;

positioning the heated glass sheet at a desired position with respect to the rolls of the roll conveyor while floated by the upwardly directed pressurized air from the air hearth; and subsequently moving the rolls upwardly with respect to the stationary air hearth to again support and conveyor the heated glass sheet on the rolls after the positioning.

22. A method for heated glass sheet roll conveyor positioning, comprising:

moving a pair of drive loops respectively over a pair of support members on which rolls of a roll conveyor are supported to rotatively drive the rolls and convey a heated glass sheet on the rolls;

camming the pair of support members downwardly to move the rolls downwardly with respect to a stationary air hearth, which supplies upwardly directed pressurized air between the rolls, such that the rolls are located lower relative to the air hearth than during the heated glass sheet conveyance on the rolls to allow the upwardly directed pressurized air from the air hearth to float the heated glass sheet above the conveyor rolls;

positioning the heated glass sheet at a desired position with respect to the rolls of the roll conveyor while floated by the upwardly directed pressurized air from the air hearth; and subsequently camming the pair of support members upwardly to move the rolls upwardly with respect to the stationary air hearth to support and conveyor the heated glass sheet on the rolls after the positioning.

* * * * *

UNITED STATES PATENT AND TRADEMARK OFFICE
CERTIFICATE OF CORRECTION

PATENT NO. : 5,411,128
DATED : May 2, 1995
INVENTOR(S) : Michael J. Vild et al

It is certified that error appears in the above-indentified patent and that said Letters Patent is hereby corrected as shown below:

Column 11, Line 20 (Appln. Page 22, Line 7), "related" should be --relates--;

Column 13, Line 67, Claim 15 (Appln. Page 28, Line 18, Claim 15), "conveyor" should be --convey--;

Column 14, Line 42, Claim 21 (Appln. Page 29, Line 29, Claim 21), "conveyor" should be --convey--;

Column 14, Lines 65-66, Claim 22 (Appln. Page 30, Line 20, Claim 22), "conveyor" should be --convey--.

Signed and Sealed this

Twelfth Day of September, 1995

Attest:

BRUCE LEHMAN

*Attesting Officer*    *Commissioner of Patents and Trademarks*